United States Patent
Sakamoto

(10) Patent No.: US 7,602,104 B2
(45) Date of Patent: Oct. 13, 2009

(54) ULTRASONIC MOTOR AND PRESSING MECHANISM OF ULTRASONIC VIBRATOR

(75) Inventor: Tetsuyuki Sakamoto, Tokyo (JP)

(73) Assignee: Olympus Corporation, Tokyo (JP)

( * ) Notice: Subject to any disclaimer, the term of this patent is extended or adjusted under 35 U.S.C. 154(b) by 107 days.

(21) Appl. No.: 11/970,252

(22) Filed: Jan. 7, 2008

(65) Prior Publication Data
US 2008/0174206 A1   Jul. 24, 2008

(30) Foreign Application Priority Data
Jan. 19, 2007   (JP) .............................. 2007-010336

(51) Int. Cl.
*H02N 2/00*   (2006.01)
(52) U.S. Cl. .............................. 310/323.09; 310/323.17
(58) Field of Classification Search ............ 310/323.09, 310/323.17, 328
See application file for complete search history.

(56) References Cited

U.S. PATENT DOCUMENTS

| | | | | |
|---|---|---|---|---|
| 5,039,899 A | * | 8/1991 | Yamaguchi | ............ 310/323.16 |
| 5,416,375 A | * | 5/1995 | Funakubo et al. | ...... 310/323.16 |
| 6,091,179 A | * | 7/2000 | Tobe et al. | .................. 310/328 |
| 6,104,123 A | * | 8/2000 | Okazaki et al. | ........ 310/323.09 |
| 6,242,846 B1 | * | 6/2001 | Ashizawa et al. | ...... 310/323.02 |
| 7,039,946 B1 | * | 5/2006 | Binding et al. | .................. 726/3 |
| 7,053,527 B2 | * | 5/2006 | Mattsson et al. | ............ 310/328 |
| 2002/0030422 A1 | * | 3/2002 | Hata | ..................... 310/323.17 |

FOREIGN PATENT DOCUMENTS

| JP | 08-0985677 | * | 4/1996 |
|---|---|---|---|
| JP | HEI-11-312017 | | 11/1999 |

* cited by examiner

*Primary Examiner*—Thomas M Dougherty
(74) *Attorney, Agent, or Firm*—Scully, Scott, Murphy & Presser, P.C.

(57) ABSTRACT

Contact pressures between a driven member and an ultrasonic vibrator are balanced, making the driving characteristics in the forward and reverse directions uniform, and the driven member is driven with high driving efficiency. The invention provides a pressing mechanism of an ultrasonic vibrator for pressing sliding members against a driven member, the sliding members being provided at two or more positions corresponding to antinodes of a standing wave vibration of the ultrasonic vibrator. The pressing mechanism includes a pressing member configured to make contact with the ultrasonic vibrator at two or more positions corresponding to nodes of the standing wave vibration of the ultrasonic vibrator; and pressing-force adjusting units configured to adjustably apply pressing forces, which press the sliding members against the driven member, to the pressing member at two or more separate positions in the direction of a gap between the two or more nodes of the standing wave.

7 Claims, 6 Drawing Sheets

ULTRASONIC MOTOR AND PRESSING MECHANISM OF ULTRASONIC VIBRATOR

BACKGROUND OF THE INVENTION

1. Field of the Invention

The present invention relates to an ultrasonic motor and to a pressing mechanism of an ultrasonic vibrator.

This application is based on Japanese Patent Application No. 2007-010336, the content of which is incorporated herein by reference.

2. Description of Related Art

Ultrasonic motors, which are compact and have high torque, long stroke, and high resolution compared to electromagnetic motors, are commonly used in the related art.

Ultrasonic motors are motors for driving a driven member with a friction force that is generated between an ultrasonic vibrator and the driven member by pressing the ultrasonic vibrator against the driven member. A known pressing mechanism for pressing an ultrasonic vibrator against a driven member in the related art is disclosed, for example, in Japanese Unexamined Patent Application, Publication No. HEI-11-312017.

This pressing mechanism includes compression springs which are disposed at two locations in the longitudinal direction of the ultrasonic vibrator and which have spherical faces at their ends, and set screws for adjusting the amount of compression of the compression springs. This pressing mechanism is constructed in such a manner as to balance the contact pressure between the driven member and the ultrasonic vibrator by adjusting the amount of compression of each compression spring by adjusting the amount of engagement of each set screw, and by changing the pressing force applied to the ultrasonic vibrator from each compression spring via the spherical faces.

However, the ultrasonic vibrator pressing mechanism disclosed in Japanese Unexamined Patent Application, Publication No. HEI-11-312017 merely applies the pressing forces at a plurality of locations on a surface opposite from a contact surface between the ultrasonic vibrator and the driven member; there is no mention of the driving efficiency of the ultrasonic motor at all. Accordingly, although it is possible to balance the contact pressure between the driven member and the ultrasonic vibrator by applying the pressing forces at two locations, there is a drawback in that the driven member cannot be driven with high driving efficiency.

BRIEF SUMMARY OF THE INVENTION

The present invention has been achieved in light of the circumstances described above, and an object thereof is to provide an ultrasonic motor and a pressing mechanism of an ultrasonic vibrator in which it is possible to uniformly balance the contact pressure between a driven member and the ultrasonic vibrator, making the driving characteristics uniform in the forward and reverse directions, and to drive the driven member with high efficiency.

In order to realize the above object, the present invention provides the following solutions.

The present invention provides a pressing mechanism of an ultrasonic vibrator for pressing sliding members against a driven member, the sliding members being provided at two or more positions corresponding to antinodes of a standing wave vibration of the ultrasonic vibrator. The pressing mechanism includes a pressing member configured to make contact with the ultrasonic vibrator at two or more positions corresponding to nodes of the standing wave vibration of the ultrasonic vibrator; and pressing-force adjusting units configured to adjustably apply pressing forces, which press the sliding members against the driven member, to the pressing member at two or more positions which are separated in the direction of a gap between the two or more nodes of the standing wave.

According to the present invention, when applying the pressing forces to the pressing member while adjusting the forces with the pressing-force adjusting units, the pressing forces are transmitted to the ultrasonic vibrator in contact with the pressing member, and the sliding members provided at the ultrasonic vibrator are pressed against the driven member. Because the sliding members are disposed at positions corresponding to the antinodes of the standing wave of the ultrasonic vibrator, friction forces which repeatedly vary are generated between the sliding members and the driven member at these positions, and the driven member is driven by the friction forces.

In this case, the pressing member makes contact with the ultrasonic vibrator at two or more positions, and the pressing-force adjusting units apply the pressing forces in the same direction at two or more separate positions. Accordingly, by adjusting the pressing forces applied with each of the pressing-force adjusting units, it is possible to balance the distribution of contact pressures, at two or more positions, between the sliding members and the driven member and to make the driving characteristics uniform in the forward and reverse directions.

In addition, because the pressing member makes contact with the ultrasonic vibrator at positions corresponding to the nodes of the standing wave of the ultrasonic vibrator, the vibration of the ultrasonic vibrator at these contact positions is minimized; therefore, it is possible to avoid disturbing the vibration of the ultrasonic vibrator due to the contact. In other words, it is possible to utilize the vibration for driving the driven member without disturbing the vibration of the ultrasonic vibrator. Accordingly, the driving efficiency of the ultrasonic vibrator can be improved.

In the invention described above, the pressing member may make contact with the ultrasonic vibrator at positions corresponding to nodes of a flexural vibration of the ultrasonic vibrator.

The ultrasonic vibrator drives the driven member by exciting the longitudinal vibration and the flexural vibration simultaneously and making the sliding members undergo substantially elliptical motion to vibrate the driven member. Accordingly, by making the pressing member contact the ultrasonic vibrator at the positions corresponding to the nodes of the flexural vibration of the ultrasonic vibrator, it is possible to effectively drive the driven member without disturbing the flexural vibration.

In the invention described above, the pressing member may extend, in the direction of the gap between the two or more nodes of the standing wave, longer than the overall length of the ultrasonic vibrator, and two or more of the pressing-force adjusting units may be disposed at both ends of the pressing member.

In this way, at outer sides of the ultrasonic vibrator in the longitudinal direction, the pressing-force adjusting units can be disposed at overlapping positions in the height direction of the ultrasonic vibrator, thus reducing the thickness of the ultrasonic motor.

In the invention described above, the pressing member may make substantially point contact with the ultrasonic vibrator.

In this way, the contact areas between the pressing member and the ultrasonic vibrator are limited to the regions close to the nodes of the standing wave. Accordingly, it is possible to avoid disturbing the vibration of the ultrasonic vibrator more effectively.

In the invention described above, the pressing member may make substantially line contact with the ultrasonic vibrator, in a direction orthogonal to the direction of the gap between the two or more nodes of the standing wave.

In this way, in the same manner as with making point contact between the pressing member and the ultrasonic vibrator, a reduction in driving efficiency can be prevented without disturbing the vibration of the ultrasonic vibrator generated in the direction of the gap between the nodes of the standing wave.

In the invention described above, a contact portion between the pressing member and the ultrasonic vibrator may be formed of an elastic member.

In this way, because the contact portion made of the elastic member is elastically deformed due to the vibration of the ultrasonic vibrator, the vibration of the ultrasonic vibrator is not disturbed. Accordingly, it is possible to drive the driven member with high driving efficiency.

The present invention provides an ultrasonic motor comprising an ultrasonic vibrator that generates a standing-wave vibration forming two or more nodes and two or more antinodes with gaps therebetween in one direction and that includes sliding members at two or more positions corresponding to the antinodes of the standing-wave vibration; a driven member that is driven by a frictional force between the sliding members of the ultrasonic vibrator and the driven member; and any one of the pressing mechanisms described above.

According to the present invention, it is possible to reduce the electrical power consumption and obtain a high driving force by pressing the ultrasonic vibrator against the driven member, by operating the pressing mechanism, in such a manner as to be driven with high driving efficiency.

The present invention provides advantages in that it is possible to uniformly balance the contact pressure between the driven member and the ultrasonic vibrator, make the driving characteristics in the forward and reverse directions uniform, and to drive the driven member with high driving efficiency.

DETAILED DESCRIPTION OF THE INVENTION

An ultrasonic motor 1 and a pressing mechanism 5 of an ultrasonic vibrator 2 according to an embodiment of the present invention will be described below with reference to FIGS. 1 to 7.

Figure 1:
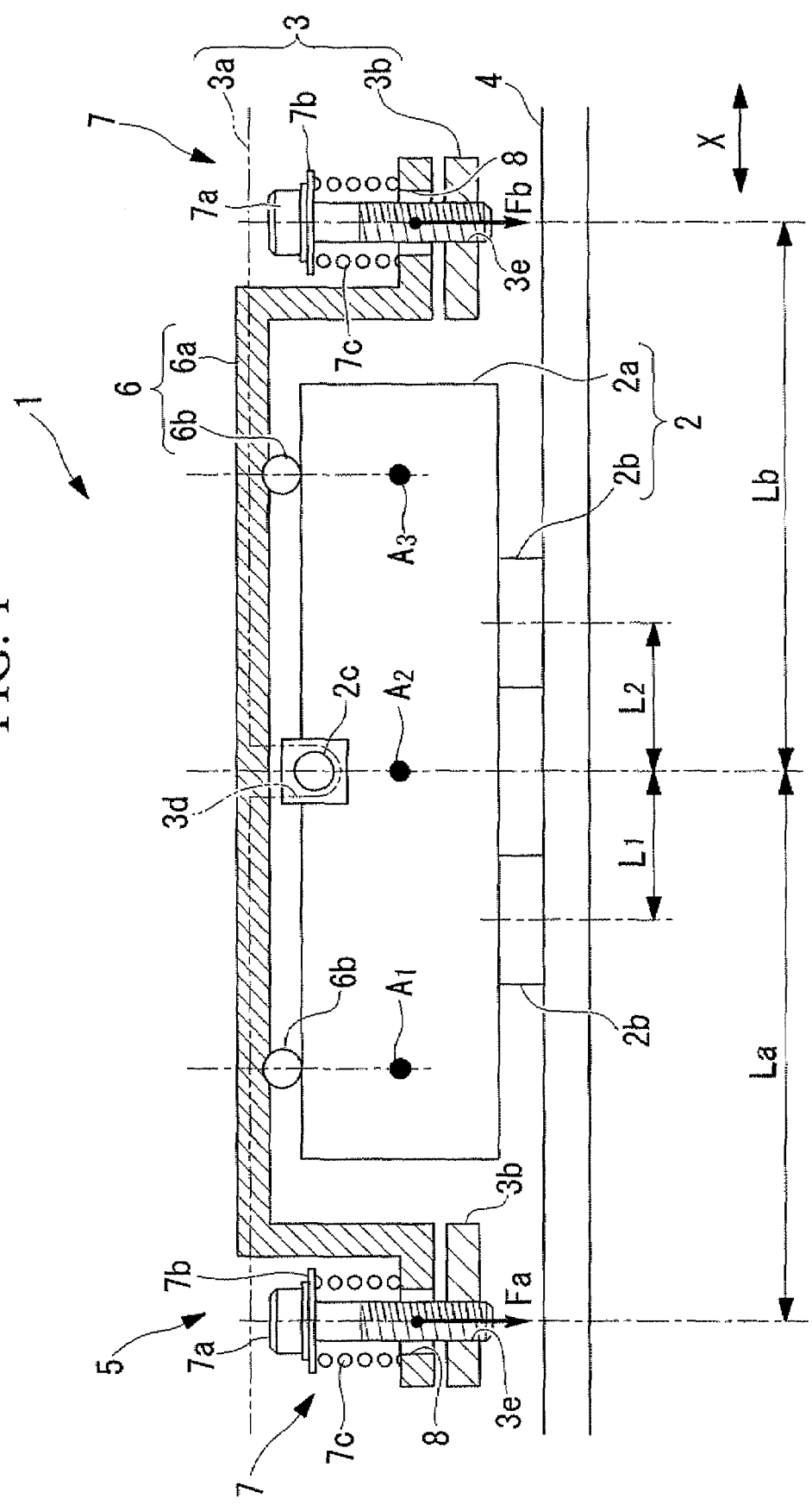
FIG. 1 is a front view showing an ultrasonic motor according to an embodiment of the present invention.

As shown in FIG. 1, the ultrasonic motor 1 according to this embodiment includes the ultrasonic vibrator 2, holders 3 for supporting the ultrasonic vibrator 2, a driven member 4 which is in contact with the ultrasonic vibrator 2 and which is driven relative to the ultrasonic vibrator 2, and the pressing mechanism 5 for pressing the ultrasonic vibrator 2 against the driven member 4.

The ultrasonic vibrator 2 includes a rectangular-block-shaped piezoelectric layered member 2a, two friction-contact members (sliding members) 2b, and guide pins 2c. The piezoelectric layered member 2a is made up of a stack of rectangular piezoelectric ceramic sheets. On one side of each of the piezoelectric ceramic sheets, sheets of inner electrodes are provided. The friction-contact members 2b are bonded to one side surface of the piezoelectric layered member 2a and are in close contact with the driven member 4. The guide pins 2c protrude from the two side surfaces adjacent to the side surface on which the friction-contact members 2b are provided, in the direction perpendicular to the side surfaces.

Figure 2:
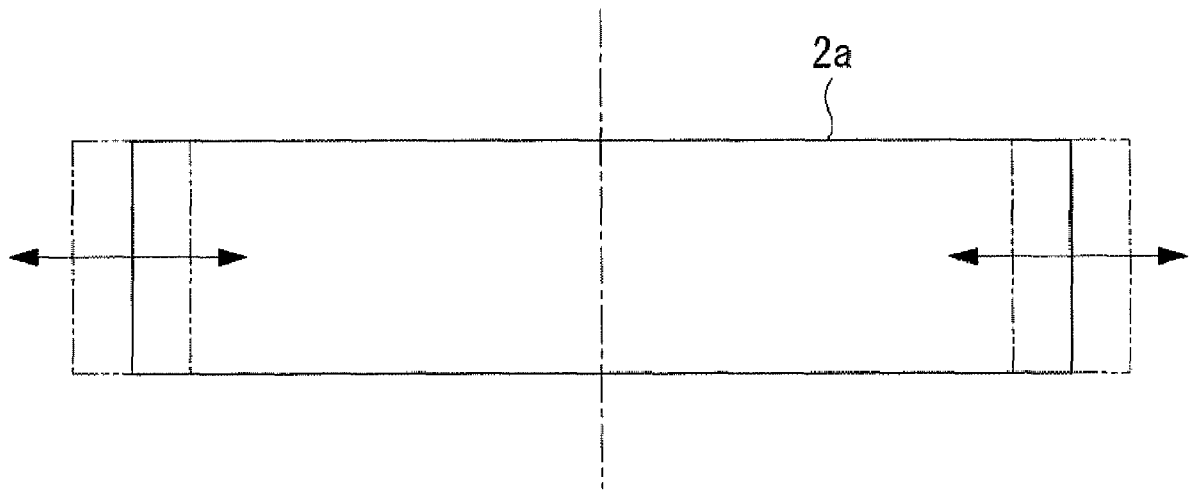
FIG. 2 is a diagram showing a longitudinal vibration of an ultrasonic vibrator of the ultrasonic motor in FIG. 1.
Figure 3:
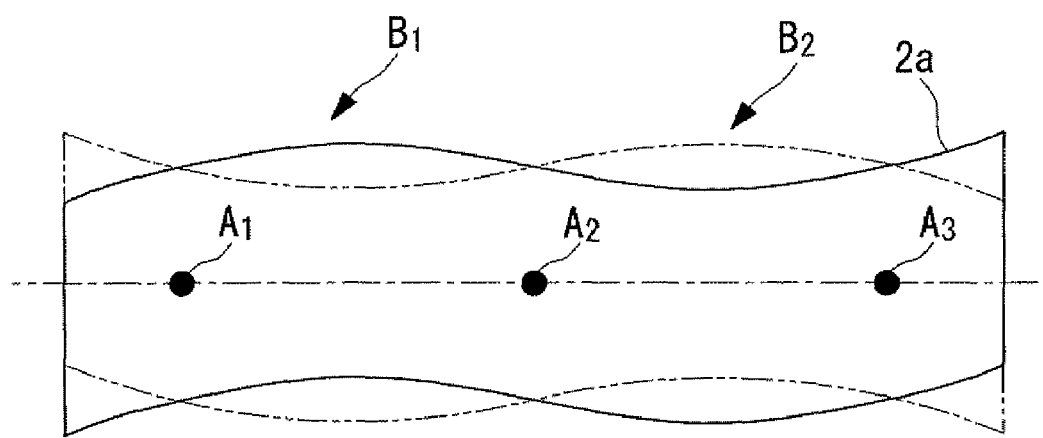
FIG. 3 is a diagram showing a flexural vibration of the ultrasonic vibrator of the ultrasonic motor in FIG. 1.

By applying an AC voltage having a predetermined pattern to the inner electrodes, a first-order longitudinal vibration shown in FIG. 2 and a second-order flexural vibration shown in FIG. 3 are excited in the piezoelectric layered member 2a.

In particular, the second-order flexural vibration shown in FIG. 3 has standing-wave vibration nodes $A_1$, $A_2$, and $A_3$ at three separate positions in the longitudinal direction of the piezoelectric layered member 2a. Antinodes $B_1$ and $B_2$ are formed at two positions between these three nodes $A_1$, $A_2$, and $A_3$.

The friction-contact members 2b, which are formed in a rectangular-block shape, are attached with a bonding agent or the like at positions corresponding to the antinodes B of the second-order flexural vibration of the ultrasonic vibrator 2.

Figure 4:
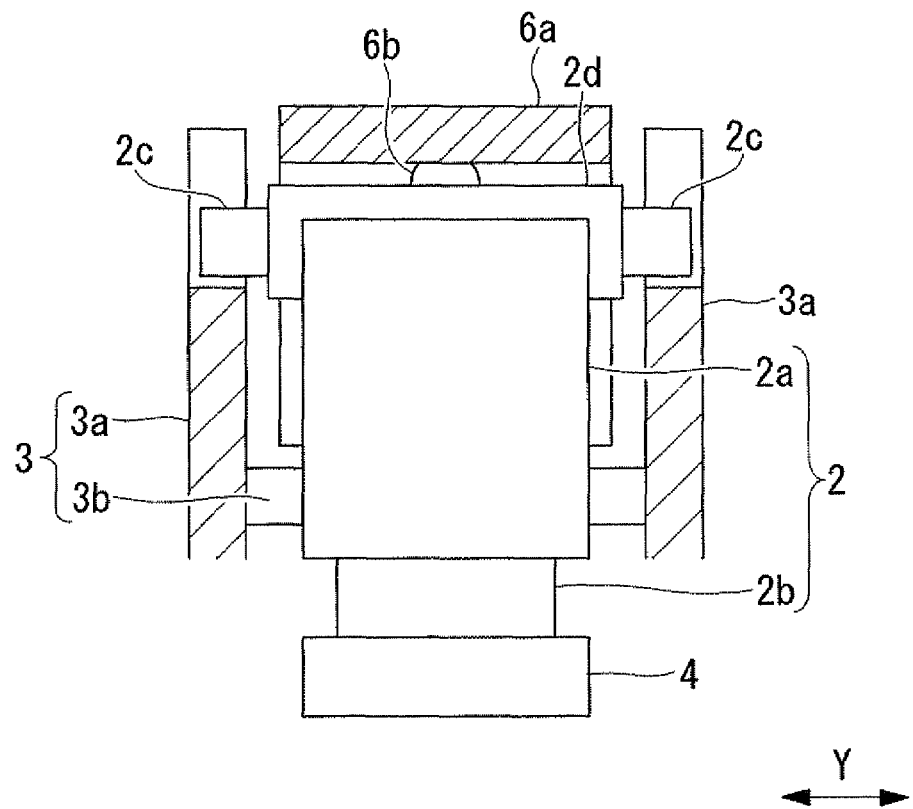
FIG. 4 is a longitudinal sectional view of the ultrasonic motor in FIG. 1 taken along line A-A.

As shown in FIG. 4, the guide pins 2c, extending in the Y-direction, are provided at both ends of a guide member 2d that is secured, with a bonding agent or the like, in such a manner as to cover the center of the side surface of the piezoelectric layered member 2a at the opposite side from the surface on which the friction-contact members 2b are secured. The positions of the guide pins 2c correspond to the node $A_2$ of the flexural vibration formed, along the X-direction shown in FIG. 1, at the center of the piezoelectric layered member 2a. Almost no vibration occurs at these positions even when the flexural vibration is generated.

Figure 5:
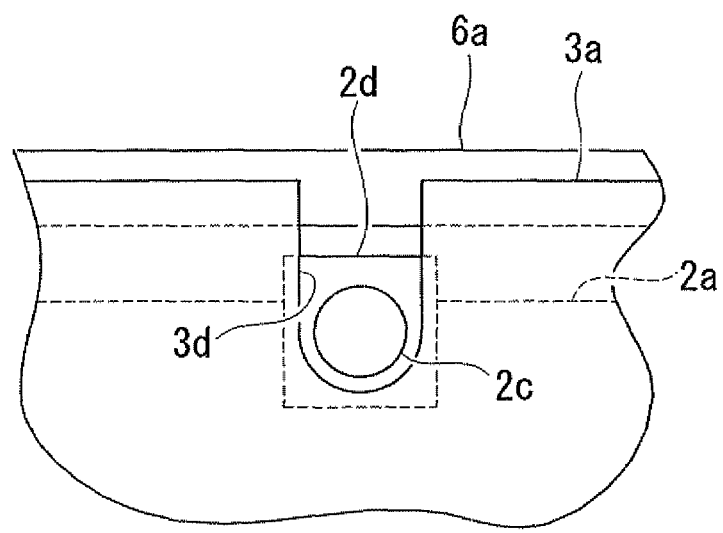
FIG. 5 is a front view showing a holder for supporting the ultrasonic vibrator of the ultrasonic motor in FIG. 1.
Figure 6:
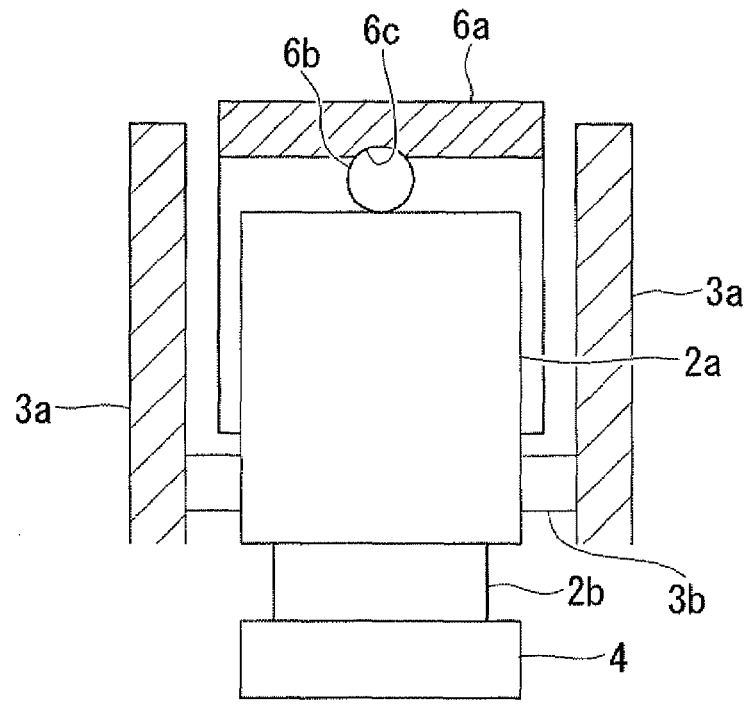
FIG. 6 is a longitudinal sectional view of the ultrasonic motor in FIG. 1 taken along line B-B.

As shown in FIGS. 4 and 6, the holders 3 include two flat plate members 3a that are adjacent to the side surfaces of the ultrasonic vibrator 2, with a gap in the Y-direction therebetween, and fixed members 3b that are bridged across so as to couple these flat plate members 3a in the gap direction. As shown in FIG. 5, the flat plate members 3a are provided with grooves 3d extending from the edges of the flat plate members 3a. The width of the grooves 3d is formed slightly larger than the diameter of the guide pins 2c. Accordingly, as shown in FIGS. 1 and 4, by inserting the guide pins 2c into the grooves 3d, movement of the ultrasonic vibrator 2 relative to the holders 3 in the X-direction and the Y-direction is restricted.

Threaded holes 3e are provided in the fixed members 3b to engage with bolts 7a of pressing-force adjusting units 7 described below.

The driven member 4 is a flat plate-shaped member that makes contact with the two friction-contact members 2b simultaneously. The driven member 4 is supported by a guide rail or a stage in such a manner as to be capable of smoothly moving only in the X-direction.

The pressing mechanism 5 includes a pressing member 6 disposed facing the side surface of the ultrasonic vibrator 2 at the opposite side from the surface to which the friction-contact members 2b are secured, and the pressing-force adjusting units 7 for applying pressing forces Fa and Fb urging the pressing member 6 in the direction of the friction-contact members 2b.

The pressing member 6 includes a pressing plate 6a disposed opposite the ultrasonic vibrator 2 with a gap therebetween, and spheres 6b held between the pressing plate 6a and the ultrasonic vibrator 2. The pressing plate 6a has a crank shape extending toward both sides of the ultrasonic vibrator 2, exceeding the overall length of the ultrasonic vibrator 2 in the longitudinal direction, both ends thereof being bent in the height direction of the ultrasonic vibrator 2 toward the friction-contact members 2b and then bent again in the longitudinal direction.

As shown in FIG. 6, depressed portions 6c for making surface contact with the spheres 6b are provided on the surface of the pressing plate 6a in contact with the spheres 6b. The depressed portions 6c are disposed at the positions corresponding to the nodes $A_1$ and $A_3$, which are located at both ends, among the three flexural vibration nodes $A_1$, $A_2$, and $A_3$ of the piezoelectric layered member 2a. Accordingly, when the spheres 6b are received in the depressed portions 6c and are held between the pressing plate 6a and the piezoelectric layered member 2a, the spheres 6b make point contact with the positions corresponding to the vibration nodes $A_1$ and $A_3$ of the piezoelectric layered member 2a. In addition, through holes 8 having inner diameters that are sufficiently larger than the outer diameters of bolts 7a are provided at both ends of the pressing plate 6a.

Figure 7:
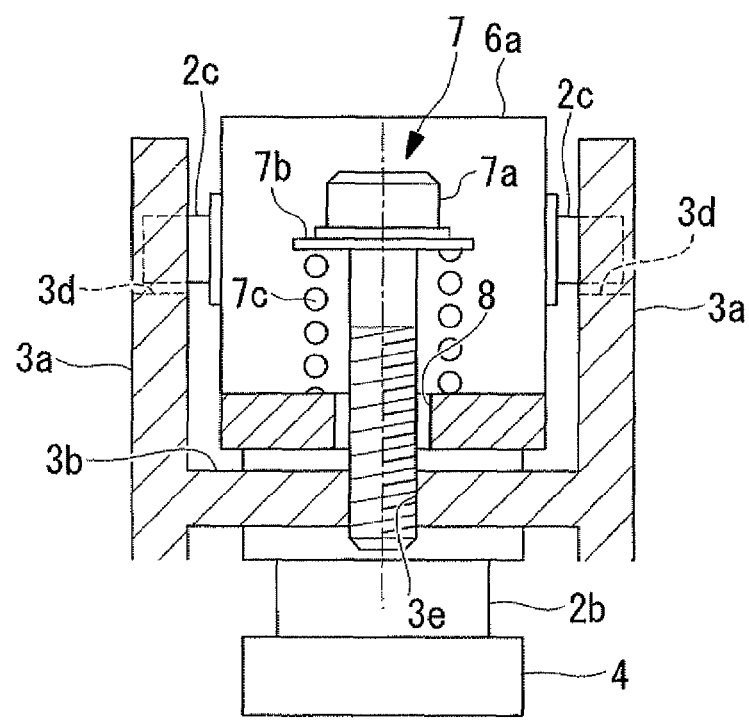
FIG. 7 is a longitudinal sectional view showing a pressing-force adjusting unit of the ultrasonic motor in FIG. 1.

As shown in FIGS. 1 and 7, the pressing-force adjusting units 7 include the bolts 7a that pass through the through holes 8 formed at both ends of the pressing plate 6a and that engage with the threaded holes 3e of the fixed members 3b of the holders 3; and compression coil springs 7c, through which the bolts 7a pass, held between the heads of the bolts 7a and both ends of the pressing plate 6a via washers 7b. The amount of compression of the compression coil springs 7c is changed by adjusting the amount of engagement of the bolts 7a in the threaded holes 3e. Accordingly, it is possible to adjust the pressing forces applied to the ultrasonic vibrator 2 from the pressing plate 6a via the spheres 6b.

The operation of the ultrasonic motor 1 and the pressing mechanism 5 of the ultrasonic vibrator 2 according to this embodiment, configured in this way, will be described below.

To press the ultrasonic vibrator 2 against the driven member 4 using the pressing mechanism 5 according to this embodiment, the amount of compression of the compression coil springs 7c is increased by screwing the bolts 7a, constituting the pressing-force adjusting units 7, into the threaded holes 3e provided in the holders 3. Accordingly, spring forces of the compression coil springs 7c increase, thus increasing the pressing forces Fa and Fb that press the pressing plate ha.

Because the spheres 6b are held between the pressing plate 6a and the piezoelectric layered member 2a of the ultrasonic vibrator 2, the pressing forces Fa and Fb are transmitted to the piezoelectric layered member 2a via the spheres 6b, and the friction-contact members 2b secured to the piezoelectric layered member 2a are pressed against the driven member 4. In this embodiment, the pressing-force adjusting units 7 are provided at two positions at both ends in the longitudinal direction of the ultrasonic vibrator 2, and the spheres 6b pressed against the piezoelectric layered member 2a are provided at two positions separated by a gap in the longitudinal direction of the ultrasonic vibrator 2.

Accordingly, by adjusting the pressing forces Fa and Fb applied with each of the pressing-force adjusting units 7, the pressing forces transmitted to the piezoelectric layered member 2a via the spheres 6b located at two positions can be adjusted. As a result, it is possible to uniformly balance the contact pressure between the driven member 4 and the two friction-contact members 2b provided at the positions corresponding to the two antinodes $B_1$ and $B_2$ of the flexural vibration of the piezoelectric layered member 2a. In other words, by making the pressing forces exerted on the two friction-contact members 2b uniform, it is possible to realize the uniform driving characteristic even when the rotation direction of a substantially elliptical motion generated at the friction-contact members 2b is changed to the opposite direction.

In addition, in this embodiment, the spheres 6b press the piezoelectric layered member 2a at the positions corresponding to the two nodes $A_1$ and $A_3$ of the flexural vibration of the piezoelectric layered member 2a. Because the positions corresponding to these nodes $A_1$ and $A_3$ are scarcely displaced due to the flexural vibration, it is possible to press these positions without disturbing the flexural vibration. That is, it is possible to drive the ultrasonic vibrator 2 with high efficiency without decreasing the driving efficiency. Accordingly, it is possible to reduce the electrical power consumption required for obtaining the same driving force and to obtain a high driving force with the same electrical power consumption.

In particular, because the pressing plate 6a makes point contact with the piezoelectric layered member 2a via the spheres 6b, the contact areas thereof are minimized, and the effect of preventing a decrease in the driving efficiency is extremely high. By providing the spheres 6b independently of the pressing plate 6a and the piezoelectric layered member 2a, the spheres 6b can be rotated on the surface of the piezoelectric layered member 2a even when the longitudinal vibration is generated in the piezoelectric layered member 2a; therefore, a further advantage is afforded in that the longitudinal vibration is not disturbed.

As shown in FIG. 1, in order to uniformly apply the pressing forces to the two friction-contact members 2b, it is necessary to satisfy expression (1) below:

$$Fa/Fb = (Lb + (L_1 - L_2)/2)/(La - (L_1 - L_2)/2) \qquad (1)$$

where $L_1$ and $L_2$ are the distances from the center node $A_2$ of the piezoelectric layered member 2a to the center of the friction-contact members 2b, La and Lb are the distances from the center node $A_2$ to the center lines of the compression coil springs 7c, and Fa and Fb are the pressing forces generated by each of the compression coil springs 7c.

In other words, even when a positional shift occurs during assembly of the compression coil springs 7c, it is possible to easily make the pressing forces applied to the driven member 4 from the two friction-contact members 2b uniform by properly adjusting the pressing forces Fa and Fb applied by the compression coil springs 7c at each of the pressing-force adjusting units 7 provided at both sides in the longitudinal direction of the ultrasonic vibrator 2.

No measurement, such as the values of pressing forces Fa and Fb or the amounts of positional shifts of the compression coil springs 7c, is required for adjusting the pressing forces Fa and Fb applied to the compression coil springs 7c. The pressing forces Fa and Fb are properly adjusted by confirming, using an encoder or an optical sensor, the difference in moving speed between the forward and reverse directions while operating the ultrasonic vibrator 2.

With the ultrasonic motor 1 according to this embodiment, because the pressing plate 6a extends longer than the overall length of the ultrasonic vibrator 2 in the longitudinal direction and is bent in a crank shape, the compression coil springs 7c and the bolts 7a can be disposed at an intermediate position in the height direction of the ultrasonic vibrator 2. As a result, an advantage is afforded in that spaces for receiving the compression coil springs 7c and the bolts 7a are disposed at overlapping positions in the height direction of the ultrasonic vibrator 2, allowing the thickness of the ultrasonic motor 1 to be reduced.

In other words, with the ultrasonic motor 1 according to this embodiment, it is possible to achieve a thin construction in which the driving efficiency is high, the electrical power consumption is low, and the driving characteristics do not change between the forward and reverse directions by operating the pressing mechanism 5.

Figure 8:
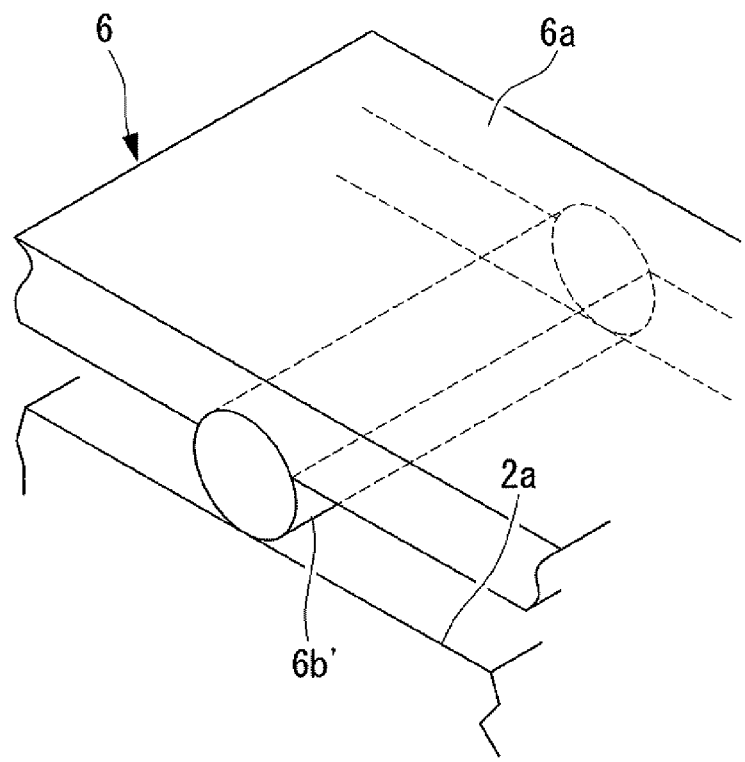
FIG. 8 is a partial perspective view showing a modification of a pressing member of the ultrasonic motor in FIG. 1.

In this embodiment, the pressing member 6 is formed of the pressing plate 6a and the spheres 6b. Instead of this, however, the pressing member 6 may be formed of the pressing plate 6a and a cylindrical member 6b', as shown in FIG. 8. In this case, the cylindrical member 6b' may be disposed between the pressing plate 6a and the piezoelectric layered member 2a, with an axis of the cylindrical member 6b' being orthogonal to the longitudinal direction of the piezoelectric layered member 2a. In this way, in the same manner as with the spheres 6b, an advantage is afforded in that the contact areas with the piezoelectric layered member 2a can be minimized to line contact, and pressing forces can be applied so as not to disturb the flexural vibration and the longitudinal vibration.

Figure 9:
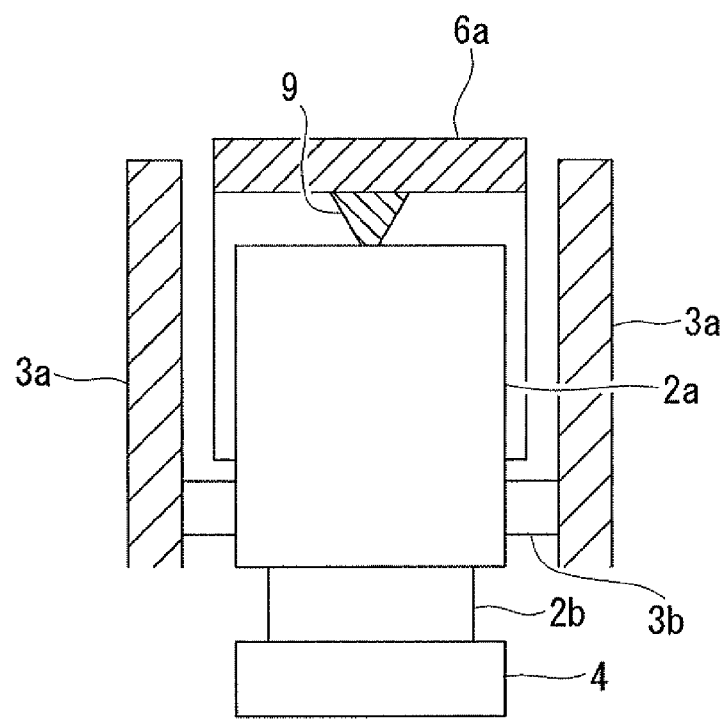
FIG. 9 is a longitudinal sectional view showing a modification of the pressing member of the ultrasonic motor in FIG. 1.
Figure 10:
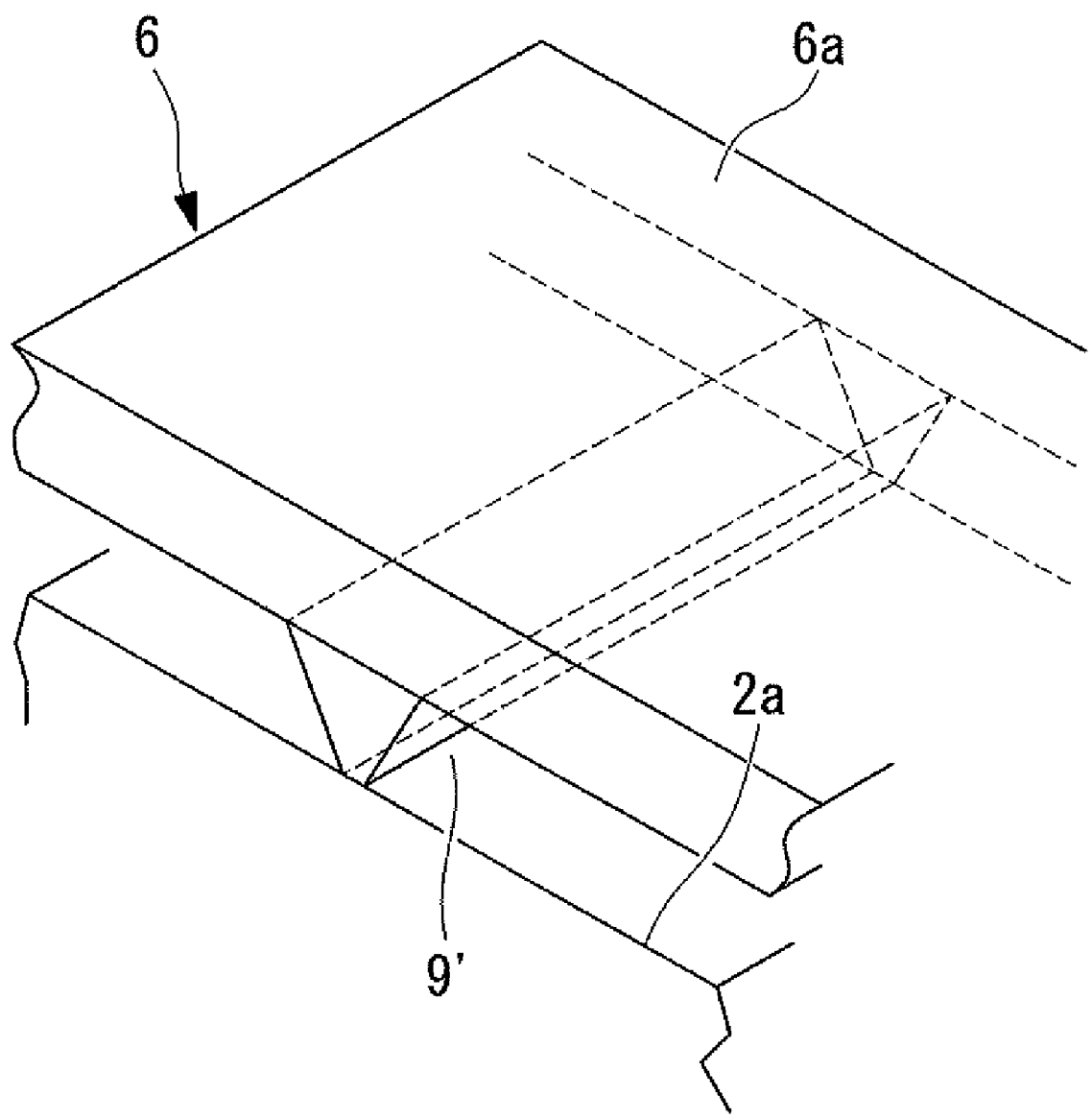
FIG. 10 is a partial perspective view showing a modification of the pressing member of the ultrasonic motor in FIG. 9.

Instead of the spheres 6b, for example, elastic members 9 having a substantially conical shape, as shown in FIG. 9, or elastic members 9' having a substantially triangular prism shape, as shown in FIG. 10, may be used. In this way, the elastic members 9 or 9' make almost point contact or line contact with the piezoelectric layered member 2a, thus allowing the region to which the pressing forces are applied to be limited. Accordingly, it is possible to avoid disturbing the flexural vibration. The pressing force can also be applied without disturbing the longitudinal vibration by elastically deforming the elastic members 9 or 9' having a substantially conical shape or a substantially triangular prism shape. By forming the elastic members 9 or 9' having a substantially conical shape or a substantially triangular prism shape, it is possible to make contact with the pressing plate 6a over a large area and to apply a stable pressing force.

Butyl rubber, silicone rubber, or any other materials having a predetermined hardness can be used as the material of the elastic members 9 and 9'. The elastic members 9 and 9' are preferably bonded to the pressing plate 6a.

The shapes of the elastic members 9 and 9' are not limited to a conical shape or a triangular prism shape; any shape may be used, such as a hemispherical or semi-cylindrical shape.

In this embodiment, the pressing forces are applied, by the spheres 6b and so on, to the piezoelectric layered member 2a at the positions corresponding to the two nodes $A_1$ and $A_3$ among the three nodes $A_1$, $A_2$, and $A_3$. Instead of this, however, pressing forces may be applied to all three nodes $A_1$, $A_2$, and $A_3$.

In this embodiment, the two friction-contact members 2b are provided at the positions corresponding to the two antinodes $B_1$ and $B_2$ to balance the pressing forces applied to these friction-contact members 2b. Instead of this, however, a single friction-contact member (not shown in the drawing) formed by coupling the two friction-contact members 2b may be used. In this case, the distribution of the contact pressures between the friction-contact member and the driven member 4 at the positions corresponding to the antinodes $B_1$ and $B_2$ of the standing wave may be made uniform by adjusting the pressing forces Fa and Fb by operating the pressing mechanism 5.

What is claimed is:

1. A pressing mechanism of an ultrasonic vibrator for pressing sliding members against a driven member, the sliding members being provided at two or more positions corresponding to antinodes of a standing wave vibration of the ultrasonic vibrator, the pressing mechanism comprising:
   a pressing member configured to make contact with the ultrasonic vibrator at two or more positions corresponding to nodes of the standing wave vibration of the ultrasonic vibrator; and
   pressing-force adjusting units configured to adjustably apply pressing forces, which press the sliding members against the driven member, to the pressing member at two or more positions which are separated in the direction of a gap between the two or more nodes of the standing wave.

2. A pressing mechanism of an ultrasonic vibrator according to claim 1, wherein the pressing member makes contact with the ultrasonic vibrator at positions corresponding to nodes of a flexural vibration of the ultrasonic vibrator.

3. A pressing mechanism of an ultrasonic vibrator according to claim 1, wherein the pressing member extends, in the direction of the gap between the two or more nodes of the standing wave, longer than the overall length of the ultrasonic vibrator, and two or more of the pressing-force adjusting units are disposed at both ends of the pressing member.

4. A pressing mechanism of an ultrasonic vibrator according to claim 1, wherein the pressing member makes substantially point contact with the ultrasonic vibrator.

5. A pressing mechanism of an ultrasonic vibrator according to claim 1, wherein the pressing member makes substantially line contact with the ultrasonic vibrator, in a direction orthogonal to the direction of the gap between the two or more nodes of the standing wave.

6. A pressing mechanism of an ultrasonic vibrator according to claim 1, wherein a contact portion between the pressing member and the ultrasonic vibrator is formed of an elastic member.

7. An ultrasonic motor comprising:
   an ultrasonic vibrator that generates standing-wave vibration forming two or more nodes and two or more antinodes with gaps therebetween in one direction and that includes sliding members at two or more positions corresponding to the antinodes of the standing-wave vibration;
   a driven member that is driven by a frictional force between the sliding members of the ultrasonic vibrator and the driven member; and
   a pressing mechanism according to claim 1.

* * * * *